United States Patent
Glenn, Jr.

[15] 3,650,148
[45] Mar. 21, 1972

[54] TOOL TO DETERMINE QUANTITY OF OIL

[72] Inventor: James J. Glenn, Jr., Long Beach, Calif.
[73] Assignee: Triangle Service, Inc., Long Beach, Calif.
[22] Filed: May 23, 1968
[21] Appl. No.: 731,445

[52] U.S. Cl. ............................................73/61.1 R, 73/155
[51] Int. Cl. ......................................................E21B 47/12
[58] Field of Search ...............................73/61.1, 425.4, 155

[56] References Cited

UNITED STATES PATENTS

| | | | |
|---|---|---|---|
| 3,530,711 | 9/1970 | Tocanne | ...................................73/155 |
| 2,613,848 | 10/1952 | Wood | ...............................73/425.4 X |
| 2,862,561 | 12/1958 | Teubner | ............................73/425.4 X |
| 3,103,812 | 9/1963 | Bourne, Jr. et al. | ......................73/155 |
| 3,130,808 | 4/1964 | Walker, Jr. et al. | ...................73/155 X |
| 3,195,042 | 7/1965 | Glenn, Jr. et al | ......................73/155 X |
| 3,248,938 | 5/1966 | Hill et al. | ...................................73/155 |
| 3,279,249 | 10/1966 | Tocanne | ..............................73/155 X |
| 3,371,527 | 3/1968 | Moulin | ....................................73/155 |

Primary Examiner—Louis R. Prince
Assistant Examiner—Joseph W. Roskos
Attorney—Kendrick, Subkov & Kriegel, Philip Subkow and Bernard Kriegel

[57] ABSTRACT

A tool for determining the quantity of oil in an oil well comprising a tubular housing having a sample chamber located therein. Remotely controlled valves positioned above and below the sample chamber serve to trap a sample for measurement. An electrode positioned within the chamber and connected to a resistance recording device on the surface measures the amount of oil in an oil-water mixture in the sample chamber.

9 Claims, 5 Drawing Figures

PATENTED MAR 21 1972
3,650,148
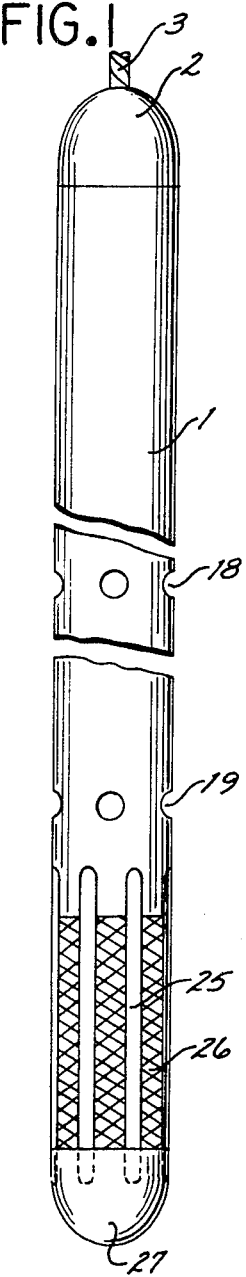
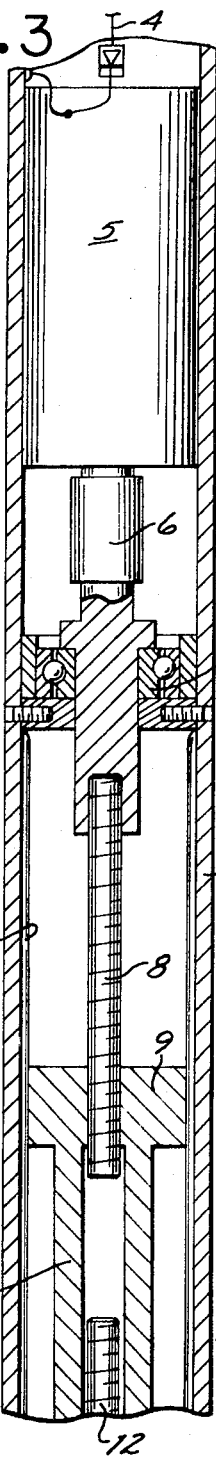
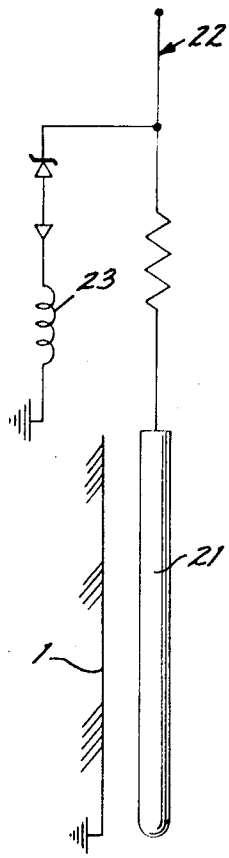
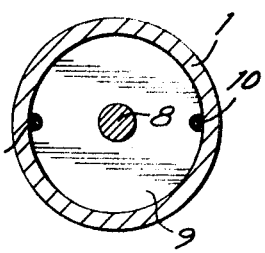
FIG. 1
FIG. 3
FIG. 4
FIG. 2
FIG. 5
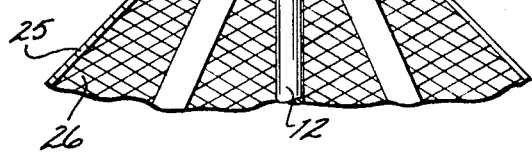
INVENTOR.
JAMES J. GLENN, JR.
BY
ATTORNEY

TOOL TO DETERMINE QUANTITY OF OIL

An object of my invention is to provide a novel tool which will determine the quantity of oil and water at any desired point in the well, and which will record the percentage of water present at the tested point; this recording being carried to the surface of the ground where a record can be made of the same.

Another object of my invention is to provide a novel tool to determine the quantity of oil and water at various points throughout the depth of an oil well, and where the tool can be controlled by means of an electrical motor in the tool; the control of the motor being accomplished from the surface of the ground.

Another object of my invention is to provide a novel oil and water testing tool of the character stated which includes valves within the tool, the valves being both opened and closed by means of an electric motor, and the motor being started and stopped from the surface of the ground.

Still another object of my invention is to provide a novel tool of the character stated which can be successively opened and closed to receive samples of the fluid in the well, said control of the valves of the tool being accomplished from the surface of the ground.

Other objects, advantages and features of invention may appear from the accompanying drawing, the subjoined detailed description and the appended claims.

IN THE DRAWING

FIG. 1 is a fragmentary side elevation of my tool to determine the quantity of fluids in a well.

FIG. 2 is a vertical sectional view of the lower portion of my tool.

FIG. 3 is a vertical sectional view of the upper portion of my tool.

FIG. 4 is a diagrammatic side elevation of the electrode rod and the electrical circuit extending thereto.

FIG. 5 is a sectional view taken on line 5—5 of FIG. 3.

Referring more particularly to the drawing, the numeral 1 indicates the outer cylindrical and tubular housing which is smaller in diameter than the drilled bore of the well. This housing is provided with a suitable cable socket 2 at its upper end, which is usual and well known in the art for oil well tools. A cable 3 is attached to the socket 2 and extends to the surface. Electrical leads 4 extend through the cable and are controlled by the operator. The cable 3 also acts as a means to support or move the tool in the bore of the well. Usual hoisting equipment (not shown) accomplishes this purpose. An electric motor 5 is mounted within the housing 1 and adjacent the upper end thereof, and the power is supplied to the motor 5 through the electric lead 4 in the usual and well known manner. The operator at the surface can thus start and stop the electric motor 5 at will, for a purpose to be subsequently described. The motor 5 is fixedly positioned within the housing 1 and is provided with a drive shaft 6 which is journaled in the bearing 7. The bearing 7 is fixedly mounted within the housing 1 in any suitable manner so that it will effectively support the shaft 6. A threaded shaft 8 extends downwardly from the drive shaft 6 and this shaft is threaded into a nut 9, which is mounted for vertical movement in the housing 1 but is prevented from rotating by engagement with the vertical ribs 10. An operating tube 11 extends downwardly from the nut 9 and may be an integral part of this nut. This tube will move vertically within the housing 1 with the nut 9 as the threaded shaft 8 is rotated, as will be evident.

A rod 12 is coupled or attached to the tube 11 in any suitable manner and, consequently, will move vertically with the tube. As thus far described, when the motor 5 is actuated the threaded shaft 8 will rotate in one direction or the other, depending upon the direction of rotation of the motor 5. The motor 5, being reversible, can be controlled as required by the operator at the surface. Consequently, the nut 9 and the tube 11, together with the rod 12, can be raised or lowered within the housing 1.

A testing chamber 13 is provided within the housing 1 and this chamber will have considerable length so that a substantial quantity of fluid can be entrapped in this chamber, as will be subsequently described. A valve seat 14 is provided at the upper end of the chamber 13, and a second valve seat 15 is provided at the lower end of the chamber. A valve 16 is fixedly secured to the rod 12 and will rest on the seat 14 in one position of the parts and can be lifted off of this seat to the position shown in FIG. 2. A second valve 17 is also fixedly attached to the rod 12 and moves relative to the seat 15, that is, it will be lifted off of the seat as shown in FIG. 2 in one position of the parts. The housing 1 is provided with fluid intake ports 18 which are positioned above the seat 14 and permit entrance of fluid past the seat 14 and into the chamber 13 when the valve 16 is raised. A second set of ports 19 in the housing 1 are positioned below the seat 15. These latter ports are opened or closed by means of a tubular sleeve valve 20 which are attached to the rod 12. When the valves 16 and 17 are seated, the sleeve valve 20 is moved downwardly to open the ports 19. As shown in FIG. 2 when the valves 16–17 are unseated the valve 20 closes the ports 19. When the ports 19 are closed the chamber 13 will fill with fluid and will be subsequently tested.

An electrode tube 21 is attached to the rod 12 and extends substantially the entire length of the chamber 13 and vertically within that chamber as shown. An electrical wire 22 extends from the electrode tube 21 to the surface through suitable electronic elements 23, which are usual and well known in the art. In other words, the electrode tube 21 will determine electrical resistance of the fluid in the chamber 13 and this electrical resistance will vary, depending on the amount of oil and water within the chamber.

A fluid deflector and tool stabilizer 24 consists of a plurality of spring fingers 25 which are attached to the lower end of the housing 1. These fingers engage the bore of the well and will deflect fluid outwardly as the tool is raised, and also will tend to centralize and stabilize the tool. A suitable type of webbing 26 extends between the fingers 25 and is formed of either a metallic or nonmetallic material, as desired. A cap 27 is secured to the lower end of the rod 12 and this cap fits over the lower end of the fingers 25 to hold the deflector 24 in collapsed position when the tool is being lowered into the well. When bottom is reached the rod 12, together with the cap 27, is pushed downwardly by the motor 5 in the manner previously described, thus releasing the fingers 25 which spring outwardly to their extended position and remain in this position during the time that the tool is being raised to the surface.

IN OPERATION

The housing 1, with the other elements therein, is lowered in the oil well entirely to the bottom or approximately to the bottom. While the tool is being lowered the fluid deflector 24 is in the closed position, as shown in FIG. 1, and the valves 16–17 are seated. The sleeve valve 20 is in the open position, that is, the port 19 is open. When bottom is reached the motor 5 is actuated to unseat the valves 16–17, and simultaneously the sleeve valve 20 will close the port 19. The chamber 13 can now fill with fluid from the ports 18 and the tool is permitted to remain stationary in a vertical position for a length of time, permitting the water to settle to the bottom of the chamber 13 and the oil to float on top of this quantity of water. The electrode tube 21 extends into the separated water in the chamber 13 and extends through the demarcation line or surface between the oil and water. The resistance to the flow of electricity through the electrode tube 21 is read at the surface, and this will indicate the amount of water in the bottom of the chamber 13. In other words, this indicates the water "cut" in the oil. After a reading has been taken the motor 5 is reversed in direction and the valves 16–17 are lifted off of their seats, permitting the fluid in the chamber 13 to flow out through the ports 19. The rod 12 during this motor operation is moved downwardly, which pushes the cap 27 downwardly releasing the fingers 25 and permitting the tool stabilizer 24 to spring outwardly acting as a fluid deflector and as a stabilizer. The tool is now raised to the next desired position, after which the motor 5 is again actuated to close the valves 16–17, again trapping a sample of fluid (oil and water) in the chamber 13, and after separation of the fluids has been accomplished a second reading is taken as before, and this operation is repeated as many times as required throughout the depth of the well.

Having described my invention, I claim:

1. A tool to determine the quantity of oil in the bore of an oil well, comprising, an elongated tubular housing, said housing having a cylindrical chamber therein, valve means at each of the upper and the lower ends of the chamber, motor drive means within the housing and operatively connected to both of said valve means to open and close said valve means, means remotely spaced from the motor means to control the operation of said motor means, an electrode tube in said chamber extending lengthwise thereof, and an electronic circuit including the electrode tube and extending to a remotely spaced resistance recording means.

2. A tool to determine the quantity of oil in the bore of an oil well as recited in claim 1, and a seat for each valve within the housing, and ports in the housing above and below said chamber.

3. A tool to determine the quantity of oil in the bore of an oil well as recited in claim 1, and a seat for each valve within the housing, and ports in the housing above and below said chamber, and a sleeve valve in the housing to open and close the bottom port.

4. A tool to determine the quantity of oil in the bore of an oil well as recited in claim 1, said motor drive means within the housing comprising an electrical motor, a threaded shaft driven by the motor, a nut threaded on said shaft, means in the housing engaging the nut to prevent rotation thereof to cause reciprocation of said nut on rotation of the shaft, and means extending from the nut to said valves to actuate the valves.

5. A tool to determine the quantity of oil in the bore of an oil well as recited in claim 1, said motor drive means within the housing comprising an electrical motor, a threaded shaft driven by the motor, a nut threaded on said shaft, means in the housing engaging the nut to prevent rotation thereof to cause reciprocation of said nut on rotation of the shaft, and means extending from the nut to said valves to actuate the valves, a seat for each valve within the housing and ports in the housing above and below said chamber.

6. A tool to determine the quantity of oil in the bore of an oil well as recited in claim 1, said motor drive means within the housing comprising an electrical motor, a threaded shaft driven by the motor, a nut threaded on said shaft, means in the housing engaging the nut to prevent rotation thereof to cause reciprocation of said nut on rotation of the shaft, and means extending from the nut to said valves to actuate the valves, a seat for each valve within the housing and ports in the housing above and below said chamber, and a sleeve valve in the housing to open and close the bottom ports.

7. A tool to determine the quantity of oil in the bore of an oil well as recited in claim 1, and a fluid deflector and tool stabilizer on the lower end of said housing consisting of a plurality of spring fingers projecting outwardly from the housing to engage the bore of the oil well.

8. A tool to determine the quantity of oil in the bore of an oil well as recited in claim 1, and a seat for each valve within the housing, and ports in the housing above and below said chamber, and a fluid deflector and tool stabilizer on the lower end of said housing consisting of a plurality of spring fingers projecting outwardly from the housing to engage the bore of the oil well.

9. A tool to determine the quantity of oil in the bore of an oil well as recited in claim 1, and a seat for each valve within the housing, and ports in the housing above and below said chamber, and a sleeve valve in the housing to open and close the bottom port, a fluid deflector and tool stabilizer on the lower end of said housing consisting of a plurality of spring fingers projecting outwardly from the housing to engage the bore of the oil well.

* * * * *